United States Patent
Yoshida et al.

(10) Patent No.: US 6,865,877 B2
(45) Date of Patent: Mar. 15, 2005

(54) COMPRESSION FEED FOR HIGH HUMIDITY FUEL GAS

(75) Inventors: Michinobu Yoshida, Sapporo (JP); Toshiaki Saisho, Ohta-ku (JP)

(73) Assignees: Kanamoto Co., Ltd., Sapporo Hokkaido (JP); Unozawa-gumi Iron Works, Ltd., Tokyo (JP)

( * ) Notice: Subject to any disclaimer, the term of this patent is extended or adjusted under 35 U.S.C. 154(b) by 62 days.

(21) Appl. No.: 10/616,190

(22) Filed: Jul. 9, 2003

(65) Prior Publication Data

US 2004/0042909 A1 Mar. 4, 2004

(30) Foreign Application Priority Data

Sep. 2, 2002 (JP) ........................................ 2002-256758

(51) Int. Cl.[7] ................................................. F02C 3/22
(52) U.S. Cl. ..................................... 60/39.465; 60/736
(58) Field of Search .............................. 60/39.465, 736, 60/734, 39.12

(56) References Cited

U.S. PATENT DOCUMENTS

| | | | |
|---|---|---|---|
| 4,942,733 A | * 7/1990 | Hosford | .................. 60/267 |
| 5,321,944 A | * 6/1994 | Bronicki et al. | ............... 60/775 |
| 6,167,692 B1 | * 1/2001 | Anand et al. | ............ 60/39.182 |
| 6,233,914 B1 | * 5/2001 | Fisher | ......................... 60/780 |
| 6,526,741 B2 | * 3/2003 | Whitehead et al. | ........... 60/772 |

* cited by examiner

Primary Examiner—Ehud Gartenberg
(74) Attorney, Agent, or Firm—Merchant & Gould P.C.

(57) ABSTRACT

A device for compressing and feeding to a microturbine power generator a high humidity fuel gas such as biogas, which cools the high humidity fuel gas condensed by the compressor using an air-cooling type fin-tube radiator, condenses and liquefies the moisture, then removes it by a moisture-removing means such as a gas/liquid separator or adsorption type moisture-removing tank, which requires only enough power to drive a cooling fan, which heats the fuel gas from which the majority of the moisture has been removed in a heat exchanger utilizing the heat of compression generated in the compressor, then feeds it to piping leading to the microturbine power generator, and which is free from the residual moisture liquefying and freezing even if the fuel gas is cooled in the piping.

5 Claims, 3 Drawing Sheets

COMPRESSION FEED FOR HIGH HUMIDITY FUEL GAS

BACKGROUND OF THE INVENTION

1. Field of the Invention

The present invention relates to a gas compression feed device used when operating a small-sized microturbine power generating facility using as a fuel so-called "high humidity fuel gas" which can burn since it is mainly comprised of methane gas, but which includes a high concentration of moisture, such as the biogas generated in sewage treatment plants.

2. Description of the Related Art

In general, when using a high humidity fuel gas as the fuel of a microturbine, it is necessary to compress the high humidity fuel gas by a compressor to raise it to a pressure sufficient for use as the fuel of a turbine such as 400 kPa to 600 kPa. In the compression feed device of high humidity fuel gas used for this, normally, as shown in FIG. 2, the introduced high humidity fuel gas G1 is compressed by the gas compressor 3 and the high humidity fuel gas discharged from the compressor 3 is sent to a receiver tank 51 to make it discharge heat and thereby enable the moisture condensed and liquefied inside the high humidity fuel gas to be separated and removed by gravity. The fuel gas G5 from which moisture has generally been removed is then sent through discharge piping 10 and a discharge port 11 to the not shown microturbine. Note that the compressor 3 is provided with a cooling conduit 4 and is cooled by a heat medium such as circulating cooling water absorbing the heat of compression, but this heat is not utilized, but discharged into the atmosphere from the walls of a heat medium tank 21, the not shown radiator, etc.

At the suction side of the compressor 3, there is little change in the pressure or temperature of the high humidity fuel gas G1, so the moisture contained in the gas is difficult to liquefy, but with the high humidity fuel gas raised in pressure by the compressor 3, the moisture in the gas easily liquefies at the discharge port etc. of the compressor 3. Further, since the receiver tank 51 provided at the discharge side of the compressor 3 alone is not enough to sufficiently remove the moisture, the remaining liquid state water and gas state fuel gas and water form a mixed flow. If this is fed to the microturbine, the problem arises that the remaining liquid state water sometimes will obstruct the burning of the gas in a combustion chamber of the microturbine. Further, in cold areas, the problem sometimes arises that the remaining liquid state water will freeze in the piping from the fuel gas compression feed device to the combustion part of the turbine and block the pipes.

To solve these problems, in a compression feed device of high humidity fuel gas such as shown in FIG. 3 proposed as another prior art, instead of the receiving tank, two adsorption tanks 51a, 51b containing adsorbents are provided in parallel and switches 50a, 50b provided at their inlet sides and outlet sides are operated to alternately operate the two adsorption tanks 51a, 51b so that when adsorbing moisture at one adsorption tank, the adsorbent contained in the other adsorption tank is heated by an electrical heater etc. to separate the adsorbed moisture and regenerate the adsorbent.

Further, as another prior art, in the compression feed device of a high humidity fuel gas shown in FIG. 4, a powerful cooler 52 provided with a refrigeration machine is provided at the discharge side of the compressor 3 and the high humidity fuel gas is powerfully cooled so as to cause the moisture contained in the gas to condense and liquefy. The liquefied moisture is separated and removed from the fuel gas by a gas/liquid separator 8.

In the prior art shown in FIG. 3, however, since it is necessary to provide two adsorption tanks 51a, 51b and two switches 50a, 50b and to provide means for controlling the operation of the switches 50a, 50b, there are the problems that the capital cost and the running costs become higher and that the turbine used for frequently regenerating the adsorption tanks consumes a large amount of power. Further, in the prior art shown in FIG. 4, there are the problem that the refrigerant compressor etc. provided in the refrigeration cycle of the refrigeration machine consumes large drive power (electric power) and the problem that the facility becomes complicated and high in price. Therefore, neither method can necessarily be said to be the best.

SUMMARY OF THE INVENTION

An object of the present invention is to provide a compression feed device for high humidity fuel gas of a novel configuration which deals with the above problems in the prior art and solves all of these problems, is simple and inexpensive in system configuration yet can sufficiently separate and remove moisture contained in high humidity fuel gas and thereby enables a microturbine to be safely operated and also consumes far less drive power (electric power) for operation compared with the prior art.

To attain the above object, there is provided a compression feed device for high humidity fuel gas which compresses high humidity fuel gas, removes moisture, and feeds the gas to a microturbine power generator by being provided with a compressor for receiving and compressing high humidity fuel gas, an air-cooling type fin-tube radiator for cooling the compressed high humidity fuel gas to condense and liquefy the moisture, a moisture-removing means for separating and removing the condensed and liquefied moisture from the cooled high humidity fuel gas, and a heat exchanger for heating the fuel gas from then moisture-removing means, then passing it to a pipe leading to the microturbine power generator and which uses the heat of compression generated in the compressor so as to heat the fuel gas in the heat exchanger by being provided with a heat medium circulation system comprised of a cooling conduit provided at the compressor, a heating conduit provided at the heat exchanger, and a heat medium circulation pump for circulating the heat medium through the cooling conduit of the compressor and the heating conduit of the heat exchanger.

In the compression feed device for high humidity fuel gas of the present invention, the compressor compresses the high humidity fuel gas, while an air-cooling type fin-tube radiator cools the compressed high humidity fuel gas to cause the moisture to condense. The condensed moisture is separated and removed by the later moisture-removing means. As the moisture-removing means, it is possible to use a mechanical gas/liquid separator, an adsorption type moisture-removing tank containing an adsorbent, etc. Since the majority of the moisture contained is condensed and liquefied by radiation of heat of the high humidity fuel gas, it is efficiently separated and removed by the moisture-removing means.

After the majority of the moisture is removed, the combustion gas is further sent to the heat exchanger and is heated by the heat medium circulation system utilizing the waste heat of the compressor, that is, the heat of compression. In this way, the fuel gas supplied to the microturbine power generator has the majority of the moisture contained in it removed, then is raised in temperature by the heat exchanger, so even if the temperature falls somewhat while the gas flows through the piping, the residual moisture will not condense and liquefy or freeze, so will not obstruct the operation of the turbine.

BRIEF DESCRIPTION OF THE DRAWINGS

These and other objects and features of the present invention will become clearer from the following description of a preferred embodiment given with reference to the attached drawings, wherein.

DESCRIPTION OF THE PREFERRED EMBODIMENTS

Figure 1:
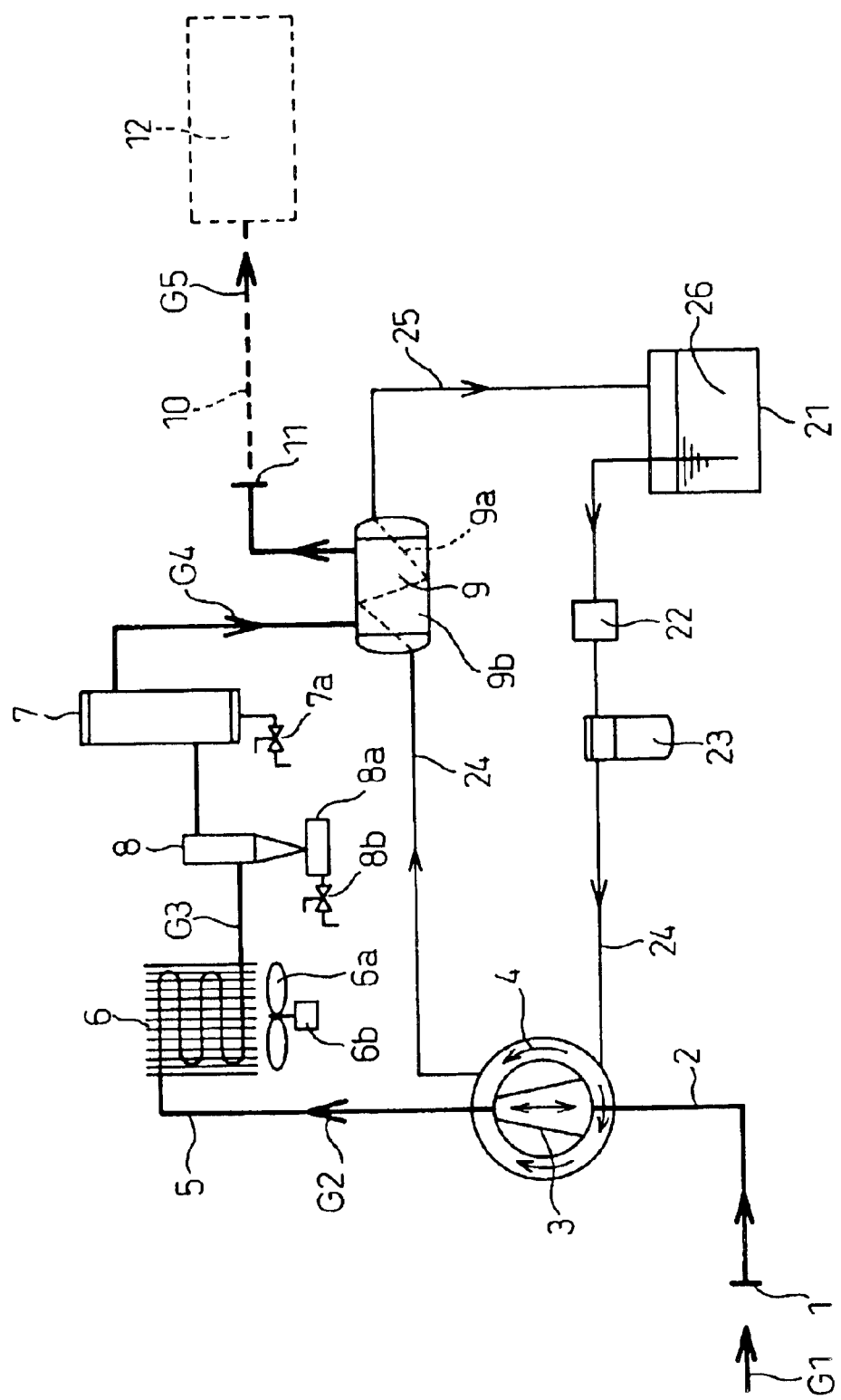
FIG. 1 is a system diagram illustrating an embodiment of a gas compression feed device according to the present invention.
Figure 2:
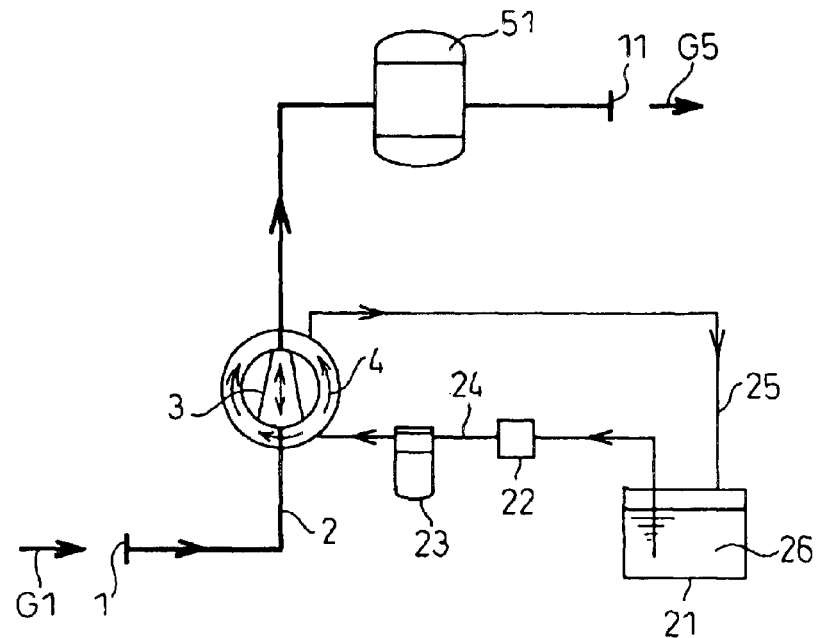
FIG. 2 is a system diagram illustrating a conventional gas compression feed device using a receiver tank.
Figure 3:
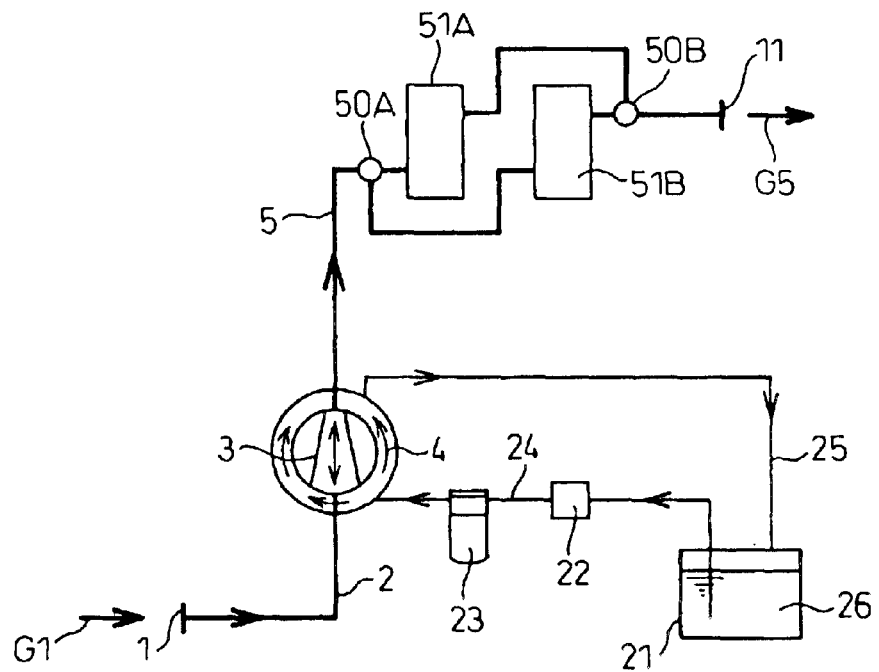
FIG. 3 is a system diagram illustrating a conventional gas compression feed device using an adsorption tank.
Figure 4:
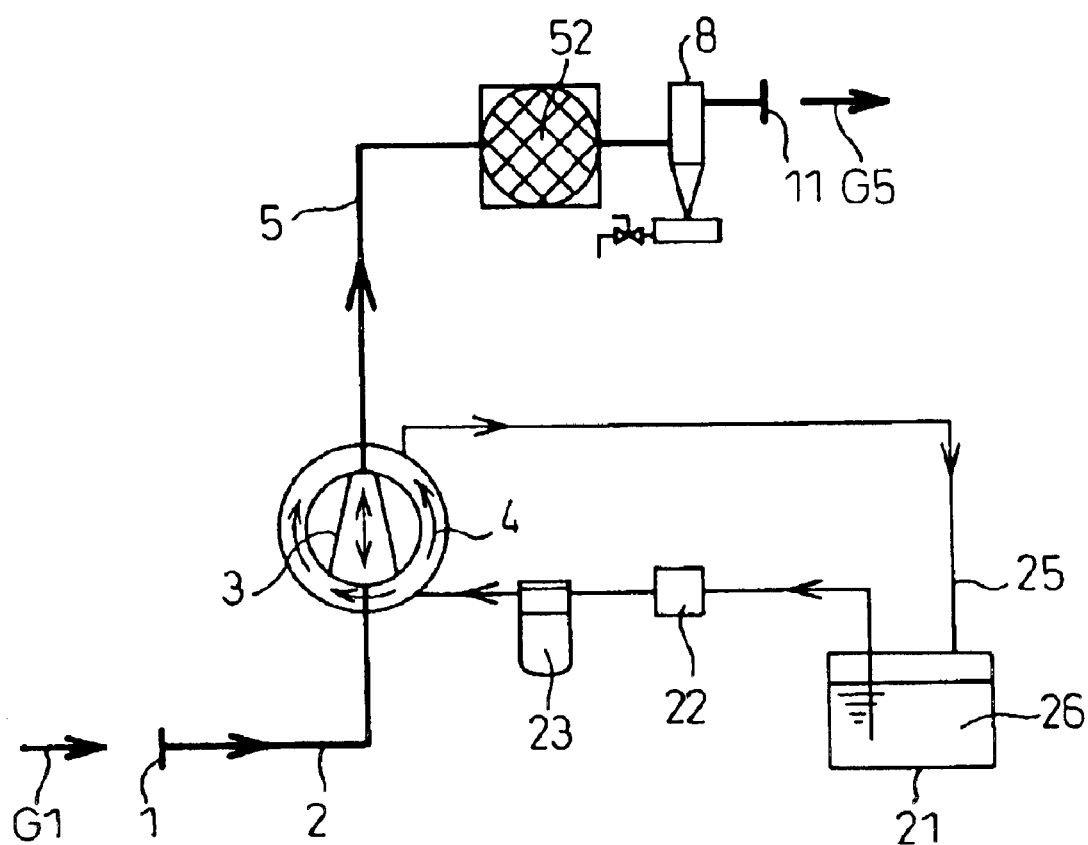
FIG. 4 is a system diagram illustrating a conventional gas compression feed device using a refrigeration machine.

A compression feed device of high humidity fuel gas shown in FIG. 1 will be explained as the best mode of working the present invention. A suction port 1 of the device is connected to a suction port of a compressor 3 by piping 2. As the compressor 3, it is possible to use a compressor of a reciprocating action type or other various types. The compressor 3 is provided with a cooling conduit 4 and can cool the compressor 3 by passing through it a liquid or gas state cooling medium. The discharge port of the compressor 3 is connected to an air-cooling type fin-tube radiator by piping 5. The radiator 6 has attached to it a cooling fan 6a driven by a motor 6b.

The outlet of the air-cooling type fin-tube radiator 6 is connected to the inlet of a gas/liquid separator 8 by piping. As the gas/liquid separator 8, it is possible to use one using centrifugal force such as a cyclone or a gas/liquid separator of various other types. The gas/liquid separator has a drain tank 8a and a drain cock 8b attached to it. The downstream side of the gas/liquid separator 8 has an adsorption type moisture-removing tank 7 connected to it. Inside it is contained an adsorbent for adsorbing moisture. Note that while not shown, the adsorption type moisture-removing tank 7 is provided with a ventilating means or heating means for regenerating the adsorbent. Further, a drain cock 7a for exhausting the water separated at the time of regenerating is attached. In the present invention, the adsorption type moisture-removing tank 7 and the gas/liquid separator 8 are together called the "moisture-removing means". Provision of both the adsorption type moisture-removing tank 7 and the gas/liquid separator 8 is not a requirement.

The downstream side of the adsorption type moisture-removing tank 7 has a heat exchanger 9 connected to it. The heat exchanger 9 is provided with a heating conduit 9a and a heated conduit 9b. The piping extending from the adsorption type moisture-removing tank 7 is connected to the heated conduit 9b. Note that the type of the heat exchanger 9 may be any type, but for example it is possible to make the heating conduit 9a a spiral type pipe and make the entire inside space of the housing of the heat exchanger 9 containing the heating conduit 9a the heated conduit 9b.

The downstream side of the heat exchanger 9 is connected to a discharge port 11 of the device as a whole. The discharge port 11 is connected by piping 10 to an external microturbine power generator 12. In the compression feed device for high humidity fuel gas of the embodiment illustrated in the present invention, the conduits for the high humidity fuel gas and the fuel gas from which the moisture has been removed are configured as explained above.

The compression feed device of the illustrated embodiment is also provided with a heat medium circulation system as illustrated at the bottom of FIG. 1 in addition to the above conduits. This heat medium circulation system is configured by a heat medium tank 21, a heat medium circulation pump 22, a filter 23, the cooling conduit 4 of the compressor 3, and the heating conduit 9a of the heat exchanger 9. The piping 24 and 25 are connected with each other and form a closed circuit so the heat medium 26 stored in the heat medium tank 21 is biased by the heat medium circulation pump 22 and forms a flow circulating in a predetermined direction shown by the arrow.

Since the compression feed device for high humidity fuel gas of the illustrated embodiment is configured as explained above, the suction high humidity fuel gas G1 introduced from the suction port 1 passes through the suction pipe 2, is sucked into the compressor 3 as the suction gas, is compressed by the compressor 3, and is raised in pressure to a predetermined pressure as the discharge compressed gas G2. This gas is heated and becomes high in temperature by being compressed, so is cooled by a simple configuration air-cooling type fin-tube radiator 6. Here, since the gas is cooled by the radiator 6 after being raised in pressure by the compressor 3, the moisture contained in the gas is condensed and liquefied and is separated from the fuel gas inside the gas/liquid separator 8.

The condensed water separated from the fuel gas by the gas/liquid separator 8 is stored in the attached drain tank 8a, so can be discharged by opening the drain cock 8b periodically. However, the radiator 6 is an air-cooling type, so cannot completely condense and liquefy the moisture contained in the high humidity fuel gas. Therefore, if the fuel gas leaving the gas/liquid separator 8 is gradually cooled inside the piping 10 etc. leading to the downstream side microturbine power generator 12, the residual moisture might liquefy. Therefore, in the illustrated embodiment, the gas G3 containing the residual moisture leaving the radiator 6 is led to the adsorption type moisture-removing tank 7 where the slight residual moisture of the gas is adsorbed and removed by the adsorbent contained within. The gas G4 leaving the moisture-removing tank 7 becomes unsaturated in state as regards water at that pressure and temperature.

The gas G4 leaving the adsorption type moisture-removing tank 7 is led to the heat exchanger 9 and passes through the heated conduit 9b. The heating conduit 9a of the heat exchanger 9 has flowing in it a heat medium absorbing the heat of compression and becoming high in temperature, so the fuel gas from which the moisture is removed is heated by the heat medium. The heated fuel gas passes through the external piping 10 from the discharge port 11 as the discharged dry gas G5 and is fed to the microturbine power generator 12. The gas G5 heated by the heat exchanger 9 sufficiently falls in relative humidity, so even if the temperature falls somewhat in the piping 10 up to the microturbine power generator 12, the condensation and liquefaction of the residual moisture are prevented. The heat medium passing through the heating conduit of the heat exchanger 9 is returned to the heat medium tank 21.

The heat medium returning to the heat medium tank 21 is pressurized by the heat medium circulation pump 22, passes through feed piping 24, passes through a filter 23 for removing foreign matter, and is led to a cooling conduit 4 of the compressor 3. The heat medium absorbs the heat of compression generated inside the compressor 3 through the partitions and is indirectly heated by cooling the compressor 3. The heat medium passes through the feed piping 24 and is led to the heating conduit 9a of the heat exchanger 9 as explained above.

In the compression feed device for high humidity fuel gas according to the above embodiment of the present invention, it is possible to compress the high humidity fuel gas, cool it by an air-cooling type fin-tube radiator 6 by an extremely small power consumption to cause the moisture contained to condense and liquefy, and to efficiently separate and remove it by a moisture-removing means. Further, the fuel gas immediately before being discharged from the device is heated to a dry state utilizing the heat of compression of the compressor 3 in the heat exchanger 9, so the residual moisture will not liquefy in the piping 10 from the heat exchanger 9 to the microturbine power generator 12 and freezing of the moisture in the piping 10 can be prevented even in cold areas.

Note that to determine the time for replacement or time for regeneration of the adsorbent contained in the adsorption type moisture-removing tank 7, it is also possible to provide a device for measuring the weight of the moisture-removing tank 7. Further, in cold areas etc., it is of course possible to take measures to prevent a drop in temperature by providing an insulating material etc. at the discharge piping 10 in accordance with the saturation temperature and room temperature.

The device shown in FIG. 1 was fabricated as a preferred embodiment of the present invention. The dimensions were as follows. The device is used for high humidity fuel gas, but high humidity air was used for measurement for verifying the effects of the invention. Note that to convert the numerical values based on the air used to numerical values based on high humidity fuel gas, it is possible to simply convert one to the other by multiplication of the ratio of the gas constants of the fuel gas and air with Xs of the later given formula (1).

Gas to be compressed and flow rate: Air, 18 m³/hr

Suction absolute pressure: 101.3 kPa

Discharge absolute pressure: 500 kPa

Heat transfer area of air-cooling type fin-tube radiator 6: 3.2 m²

Power consumption and air flow of fan drive motor 6b: 35 W, 5 m³/min

Adsorption type moisture-removing tank 7: Deliquescence type main comprised of potassium chloride, 25 kg Heat exchanger 9: Heat transfer area 0.2 m², shell and tube type Using the fabricated device, the suction pressure of the high humidity fuel gas G1 at the suction port 1 of the compressor 3 and the humidity at the temperature state were measured to verify the effects. The results obtained were as shown in Table 1. Note that in Table 1, the figures in parentheses were calculated by the later given calculation formula, but the other figures are actually measured values.

TABLE 1

| Measurement point | Absolute pressure (kPa) | Temperature (° C.) | Moisture | Relative humidity (%) |
|---|---|---|---|---|
| Suction port (G1) | 101.3 | 37 | 0.0349 | 85 |
| G3 | 501 | 42 | (0.0103) | — |
| G4 | 501 | 45 | (0.0060) | (58) |
| Discharge port (G5) | 501 | 50 | (0.0060) | 35 (38) |

When the total pressure (kPa) is P and the steam partial pressure (kPa) is Pw, the maximum amount of moisture Xs (kg/kg') able to be contained in 1 kg of air is given by the following formula. The amount of moisture is the amount of moisture (weight of water indicated by "kg") per 1 kg' of air (weight of air indicated by "kg'"). Note that Pw is found from a steam table.

$$Xs = 0.622 \times Pw/(P-Pw) \text{ (kg/kg')} \quad (1)$$

If calculating the amount of moisture at different parts by this formula (1), since the temperature is 37° C. at G1, Pw=6.276, therefore, $$Xs = 0.622 \times 6.276/(101.3 - 6.276)$$
$$= 0.0410 \text{ (kg/kg')}$$

The relative humidity is 85% in terms of actual measured value, so the actual amount of moisture becomes:

$$0.0410 \times 0.85 = 0.0349$$

For G3, since the moisture is in a saturated state, the pressure is 501 kPa, and the temperature is 42° C., Pw=8.20, therefore $$Xs = 0.622 \times 8.20/(501-8.20) = 0.0103$$

For G4, the pressure does not change and the temperature is 45° C. (Pw=9.584). The moisture-removing tank 7 generally can reduce the humidity to a value of the same extent as the saturated state of a temperature about 10° C. lower than the inlet temperature, so for an inlet temperature of 42° C., in the saturated state at 32° C., Pw=4.755, therefore $$Xs = 0.622 \times 4.755/(501-4.755) = 0.0060$$

and the relative humidity becomes 0.0060/0.0103=0.58, that is, 58%.

At G5, since the pressure is the same and the temperature is 50° C., Pw=12.337, therefore $$Xs = 0.622 \times 12.337/(501 - 12.337)$$
$$= 0.0157$$

of moisture can be contained, but in actuality the amount of moisture contained at G5 is 0.0060 kg/kg'. Since the relative humidity is the ratio of the amounts of moisture at G4 and G5, it becomes 38%.

When the temperature drops and reaches the saturation temperature, the moisture condenses and starts to liquefy, but the saturation temperature is 32° C. That is, the gas is discharged at 50° C. and the moisture will not liquefy so long as the temperature does not drop by more than 12° C. inside the piping 10 leading to the microturbine 12.

In this way, it was verified that the compression feed device for high humidity fuel gas of the illustrated embodiment has an actual power consumption of only the 35 W required for driving the cooling fan 6a of the air-cooling type fin-tube radiator 6a and can feed sufficiently dried fuel gas to the microturbine power generator 12.

Summarizing the effects of the invention, the compression feed device for high humidity fuel gas of the present invention enables the use of high humidity fuel gas such as biogas in cases where the pressure in the combustion chamber of a power generation use microturbine is not sufficient for burning the gas. That is, the present invention provides a compression feed device for high humidity fuel gas characterized first by use of a simple configuration air-cooling type fin-tube radiator for cooling the high humidity fuel gas compressed by the compressor and condensing the moisture. Not only can the fin-tube radiator be fabricated inexpensively, but also the only power consumption required is that for driving the motor of the cooling fan. Therefore, the power consumption becomes much less than the case of driving a refrigeration machine such as in the prior art.

The present invention is characterized second by heating the fuel gas, after the moisture in it has been condensed and liquefied by the fin-tube radiator and the majority of the moisture has been removed by the moisture-removing means, utilizing the heat of combustion generated in the compressor and then discharging it into piping leading to a microturbine power generator. This means that not only is it possible to prevent the fuel gas from being naturally cooled while passing through the piping and thereby causing the residual moisture to be condensed and liquefied and possibly cause a problem, but also use is made of the heat of compression generated in the compressor which had been discarded as waste heat in the prior art. Therefore, there is no need to provide a separate heat source, the only energy consumed for heating the fuel gas in the heat exchanger is the power consumed by the motor for driving the circulation pump. This however is only naturally required even in conventional compressor cooling systems, so the present invention does not require any new energy.

While the invention has been described with reference to specific embodiments chosen for purpose of illustration, it should be apparent that numerous modifications could be made thereto by those skilled in the art without departing from the basic concept and scope of the invention.

What is claimed is:

1. A compression feed device for high humidity fuel gas which compresses high humidity fuel gas, removes moisture, and feeds the gas to a microturbine power generator by being provided with:

a compressor for receiving and compressing high humidity fuel gas, an air-cooling type fin-tube radiator for cooling the compressed high humidity fuel gas to condense and liquefy the moisture, a moisture-removing means for separating and removing the condensed and liquefied moisture from the cooled high humidity fuel gas, and a heat exchanger for heating the fuel gas from said moisture-removing means, then passing it to piping leading to said microturbine power generator and which uses the heat of compression generated in said compressor so as to heat the fuel gas in said heat exchanger by being provided with a heat medium circulation system comprised of:

a cooling conduit provided at said compressor, a heating conduit provided at said heat exchanger, and a heat medium circulation pump for circulating said heat medium through said cooling conduit of the compressor and said heating conduit of the heat exchanger.

2. A compression feed device of high humidity fuel gas as set forth in claim 1, wherein said moisture-removing means includes a gas/liquid separator for separating the fuel gas and condensed water.

3. A compression feed device of high humidity fuel gas as set forth in claim 1, wherein said moisture-removing means includes a moisture-removing tank storing an adsorbent for adsorbing condensed water.

4. A compression feed device of high humidity fuel gas as set forth in claim 1, wherein said heat medium circulation system includes a heat medium tank for storing the heat medium.

5. A compression feed device of high humidity fuel gas as set forth in claim 1, wherein said heat medium circulation system includes a filter for filtering the heat medium.

* * * * *